United States Patent
Mack et al.

(10) Patent No.: US 9,018,882 B2
(45) Date of Patent: Apr. 28, 2015

(54) VARIABLE FREQUENCY DRIVE BYPASS ENERGY SAVINGS

(75) Inventors: Steven Russell Mack, New Berlin, WI (US); William Charles Phillips, III, Evanston, IL (US); Matthew James Schimke, Wind Lake, WI (US)

(73) Assignee: Yaskawa America, Inc., Waukegan, IL (US)

( * ) Notice: Subject to any disclaimer, the term of this patent is extended or adjusted under 35 U.S.C. 154(b) by 864 days.

(21) Appl. No.: 13/211,662

(22) Filed: Aug. 17, 2011

(65) Prior Publication Data

US 2012/0187886 A1 Jul. 26, 2012

Related U.S. Application Data

(60) Provisional application No. 61/436,377, filed on Jan. 26, 2011.

(51) Int. Cl.
*H02P 1/30* (2006.01)
*H02P 27/06* (2006.01)
*H02P 27/02* (2006.01)

(52) U.S. Cl.
CPC .............. *H02P 27/06* (2013.01); *H02P 27/023* (2013.01)

(58) Field of Classification Search
USPC .................................. 318/494, 503; 361/1, 23
See application file for complete search history.

(56) References Cited

U.S. PATENT DOCUMENTS

| | | | |
|---|---|---|---|
| 7,948,721 B2 | 5/2011 | Brunner et al. | |
| 2004/0252423 A1* | 12/2004 | Boren | 361/23 |
| 2005/0007047 A1* | 1/2005 | Strothmann et al. | 318/268 |
| 2008/0273353 A1* | 11/2008 | Rumpf | 363/15 |
| 2010/0109597 A1* | 5/2010 | Steiner et al. | 318/772 |
| 2011/0234124 A1* | 9/2011 | Burd et al. | 318/51 |
| 2011/0267844 A1* | 11/2011 | He et al. | 363/21.02 |
| 2014/0050501 A1* | 2/2014 | Yoon et al. | 399/88 |
| 2014/0075982 A1* | 3/2014 | Norbeck et al. | 62/498 |

* cited by examiner

*Primary Examiner* — Kawing Chan
(74) *Attorney, Agent, or Firm* — Wood, Philips, Katz, Clark & Mortimer

(57) ABSTRACT

A Variable Frequency Drive (VFD) supplies power to rotate a motor, controlling both the speed and direction. The method normally used for this power conversion by the VFD results in energy losses and line harmonics. When the motor is driven by the VFD to be rotating at the same speed and direction as if the motor was straight across the incoming AC power, a transfer in power supply to the motor can be made using contactors to bypass the VFD. When in this bypass mode, the energy losses of the VFD are greatly reduced, and the line harmonics due to the VFD are greatly reduced. When it is subsequently recognized that the speed reference has deviated from being the same speed and direction as if the motor was straight across the incoming AC power, a transfer in power supply can be made from using contactors to once again drive the motor from the VFD.

18 Claims, 13 Drawing Sheets

VARIABLE FREQUENCY DRIVE BYPASS ENERGY SAVINGS

CROSS-REFERENCE TO RELATED APPLICATIONS

This application claims priority of provisional application No. 61/436,377 filed Jan. 26, 2011.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to variable frequency drives and, more particularly, to the energy efficiency and harmonic reduction that can be achieved by automatically switching to a bypass mode when the motor speed as powered by the variable frequency drive closely matches the motor speed that would be achieved by connecting the motor directly to the incoming power.

BACKGROUND OF THE INVENTION

One of the simplest and most common methods of driving an AC motor is applying input power directly to the motor through a switch (motor starter or contactor) in an across-the-line architecture, as shown in FIG. 2. The advantages of this architecture include simplicity, low cost, low energy losses while running, and minimal harmonics while running. Disadvantages include the motor can only run at one speed and in one direction, and switching on and off the load creates a large disturbance on the input power. The motor converts electrical energy to mechanical energy. The motor can drive a load, such as a fan or pump or some other form of machinery. In many applications it is desired to vary the output speed. Since the motor is across-the-line, it cannot be varied, so some other method must be employed. As an example, if the motor is turning a fan to create air-flow, one way to vary the air flow is to deflect the unwanted air away from the desired path. This results in wasted energy.

An AC motor can also be driven by a Variable Frequency Drive (VFD) as shown in FIG. 3. Using a VFD to drive an AC motor overcomes the disadvantages of an across-the-line architecture. The motor speed and direction can be controlled by the VFD, and there is no large disturbance on the input power when starting the motor. The variable speed control of the VFD over the motor increases the efficiency of powering the motor, versus an across-the-line method, when it is desired to vary the output energy of the motor. However, when powering the motor at the same speed and direction as if the input power were connected across-the line, the efficiency is less when using a VFD. A VFD also adds undesirable harmonics to the input power, as will be explained below.

A common VFD architecture changes AC power to DC power and then changes it back to AC power. There are variations of VFD technologies, but a common one will be described here. The incoming power is rectified to make DC power, called the DC bus, Transistors in the Inverter section are then turned on and off in a certain sequence (normally called Pulse Width Modulation, or PWM) by controlling logic which creates an AC signal on the output power leads.

There are energy losses when the VFD converts power from AC to DC and back to AC. There are voltage drops across the diodes in the converter section, which cause energy loss. There is controlling circuitry that needs power, which causes energy loss. And when the transistors in the inverter section are turned on, there are energy losses across the transistors.

Harmonics caused by a VFD are well documented. There are standards, such as IEEE 519, that have been created to limit harmonics because of the known detrimental effects. In general, a VFD, by its nature, is a non-linear load. The impedance of a non-linear load changes with the applied voltage. When a sinusoidal voltage is applied to a non-linear load, the load current will be non-sinusoidal. The non-sinusoidal currents contain harmonic currents, which then interact with the power system and can create voltage distortion. These harmonics can then affect the equipment in the power distribution and other loads.

The present invention is directed to reducing the energy losses and reducing the VFD harmonics when the motor speed as powered by the variable frequency drive closely matches the motor speed that would be achieved by connecting the motor directly to the incoming power.

It is known to use a bypass contactor to bypass the VFD and an output contactor to separate the output of the VFD from the motor. When the bypass contactor is closed and the VFD output contactor is open, this is known as bypass mode. In bypass mode, the motor is being powered through the bypass contactor in an across-the-line configuration. Bypass mode is shown in FIG. 5. When the bypass contactor is open and the VFD output contactor is closed, this is known as drive mode. In drive mode, the motor is being powered by the VFD and through the output contactor. Drive mode is shown in FIG. 6.

The present invention is directed to improvements in switching between drive mode and bypass mode.

SUMMARY OF THE INVENTION

In accordance with one aspect of the invention, an AC motor drive system comprises a variable frequency drive (VFD) for receiving AC power from a power source and developing variable frequency power at output terminals. A bypass contactor is operatively connected between the power source and an AC motor. An output contactor is operatively connected between the VFD output terminals and the AC motor. A bypass control is operatively associated with the VFD, the bypass contactor and the output contactor. The bypass control includes a drive mode in which the output contactor is controlled to connect the VFD to the motor and a bypass mode in which the bypass contactor is controlled to connect the power source to the motor. The bypass control monitors operation of the VFD to automatically switch to the bypass mode when motor speed as powered by the VFD approximates the motor speed that would be achieved by connecting the motor directly to the power source.

It is a feature of the invention that the bypass control operates in a frequency mode wherein the automatic switching occurs based on the VFD controlling the motor at the input line frequency.

It is another feature of the invention that the bypass control operates in a frequency and output current mode wherein the automatic switching occurs when both frequency and load current are within a preselect range to achieve a preselect energy savings.

It is a further feature of the invention that the bypass control is operatively associated with the VFD to monitor a frequency reference, output current and output frequency.

It is an additional feature of the invention that the bypass control develops a command to the VFD to increase a frequency reference prior to switching from the drive mode to the bypass mode.

It is still another feature of the invention that the bypass control automatically switches to the bypass mode only after motor speed as powered by the VFD approximates the motor speed that would be achieved by connecting the motor directly to the power source for a preselect period of time.

It is an additional feature of the invention that the bypass control develops a command to the VFD to stop developing output power in the bypass mode.

It is yet a further feature of the invention that the bypass control controls the output contactor to open a preselect time period after determining motor speed as powered by the VFD approximates the motor speed that would be achieved by connecting the motor directly to the power source, and controls the bypass contactor to close a preselect time period after commanding the output contactor to open.

It is yet another feature of the invention that the bypass mode monitors operation of the VFD to automatically switch from the bypass mode to the drive mode when motor speed as commanded by the VFD differs from the motor speed achieved by connecting the motor directly to the power source by a preselect amount.

It is still a further feature of the invention that the VFD is operatively connected to the bypass control with a serial communication link.

In accordance with another aspect of the invention, an AC motor drive system comprises a variable frequency drive (VFD) for receiving AC power from a power source and developing variable frequency power at output terminals. A bypass contactor is operatively connected between the power source and an AC motor. An output contactor is operatively connected between the VFD output terminals and the AC motor. A bypass control is operatively associated with the VFD, the bypass contactor and the output contactor. The bypass control includes a drive mode in which the output contactor is controlled to connect the VFD to the motor and an energy savings mode in which the bypass contactor is controlled to connect the power source to the motor. The bypass control monitors operation of the VFD to determine if operating in the energy savings mode provides a preselect energy savings and if so then automatically switching to the energy savings mode.

More particularly, the bypass control recognizes that the VFD is running the motor in the same direction and at about the same speed as if it were running through the bypass contactor, the bypass control will automatically transfer control of the motor from drive mode to bypass mode. The bypass control can be logic contained within the VFD itself, or a separate device that communicates with the VFD. Running in bypass mode allows for energy savings and reduced harmonics. Furthermore, when the bypass control recognizes that the speed reference command changes so that it is no longer tolerable to operate the motor in bypass mode, the controller will transfer control of the motor from bypass mode back to drive mode. In addition, a visual indication will be made so the user knows they are in the energy savings mode, providing them feedback in case they would like to fine tune settings to achieve even greater efficiency.

Other objects, features, and advantages of the invention will become apparent from a review of the entire specification, including the appended claims and drawings.

DETAILED DESCRIPTION OF THE PREFERRED EMBODIMENT

Figure 1:
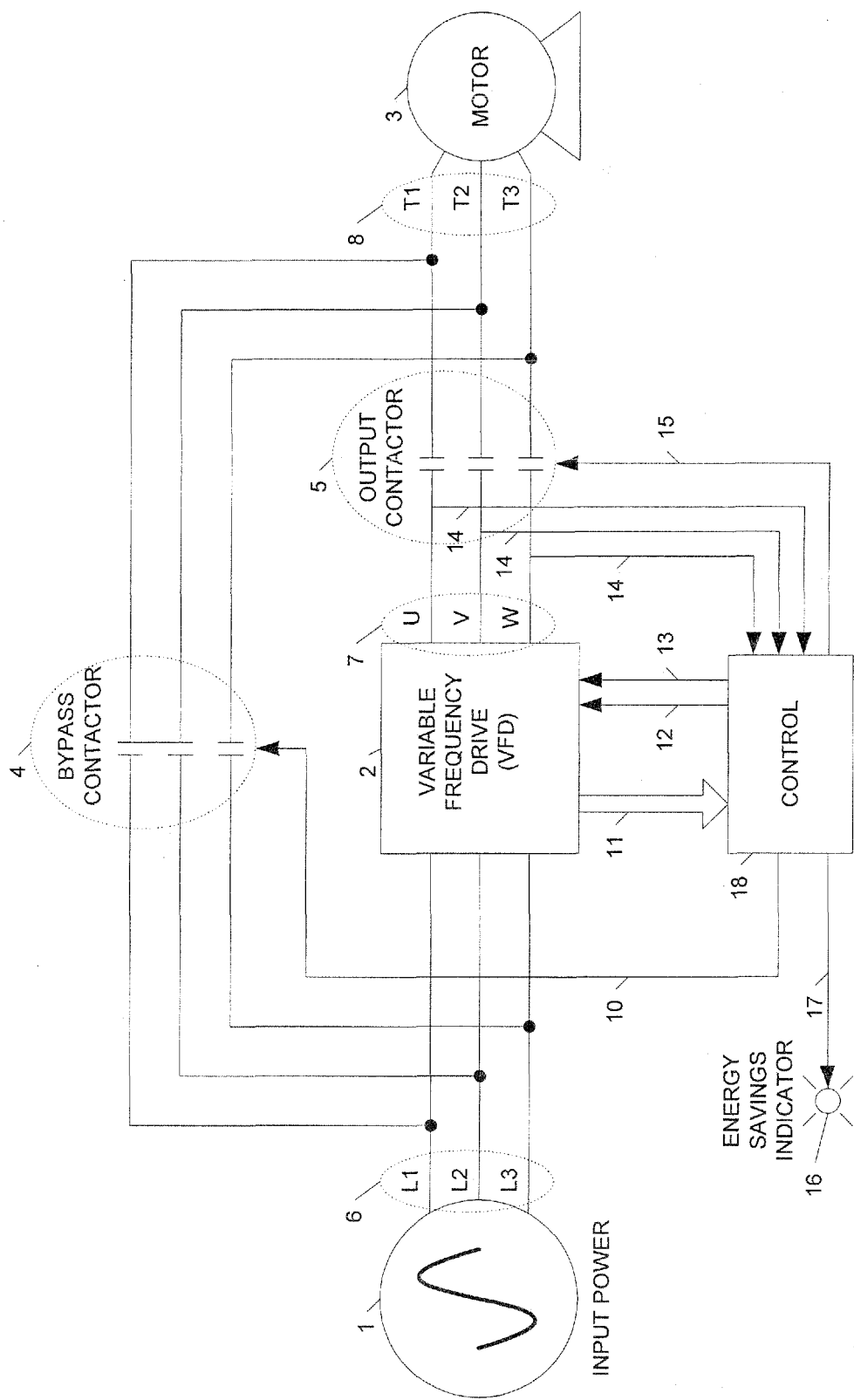
FIG. 1 is a general block diagram of a VFD in a bypass configuration including a control implementing the energy savings method in accordance with the invention.

Referring initially to FIG. 1, a VFD bypass system consisting of a variable frequency drive (VFD) in bypass configuration is illustrated. The VFD bypass system includes an AC source 1, a VFD 2, a bypass contactor 4, a VFD output contactor 5, a motor 3, and a control 18 for an energy savings mode. The AC source 1 may comprise a drive or the like developing three-phase AC power on feeder conductors 6 labeled L1, L2, and L3. The AC source 1 is grounded. The L1, L2, and L3 conductors are connected to both the bypass contactor 4 and input terminals of the VFD 2. The VFD 2, as described more particularly below, converts the AC power from the feeder conductors L1, L2, and L3, to DC power and converts it back to AC power at a select frequency which is then impressed across terminals 7 individually labeled U, V, and W. The terminals U, V, and W are connected to three (3) feeder conductors to the VFD output contactor 5. Continuing past the output contactor, the three (3) feeder conductors 8 individually labeled T1, T2, and T3 are connected to both the bypass contactor 4 opposite the L1, L2, and L3 conductors, and to the three phase motor 3.

Figure 2:
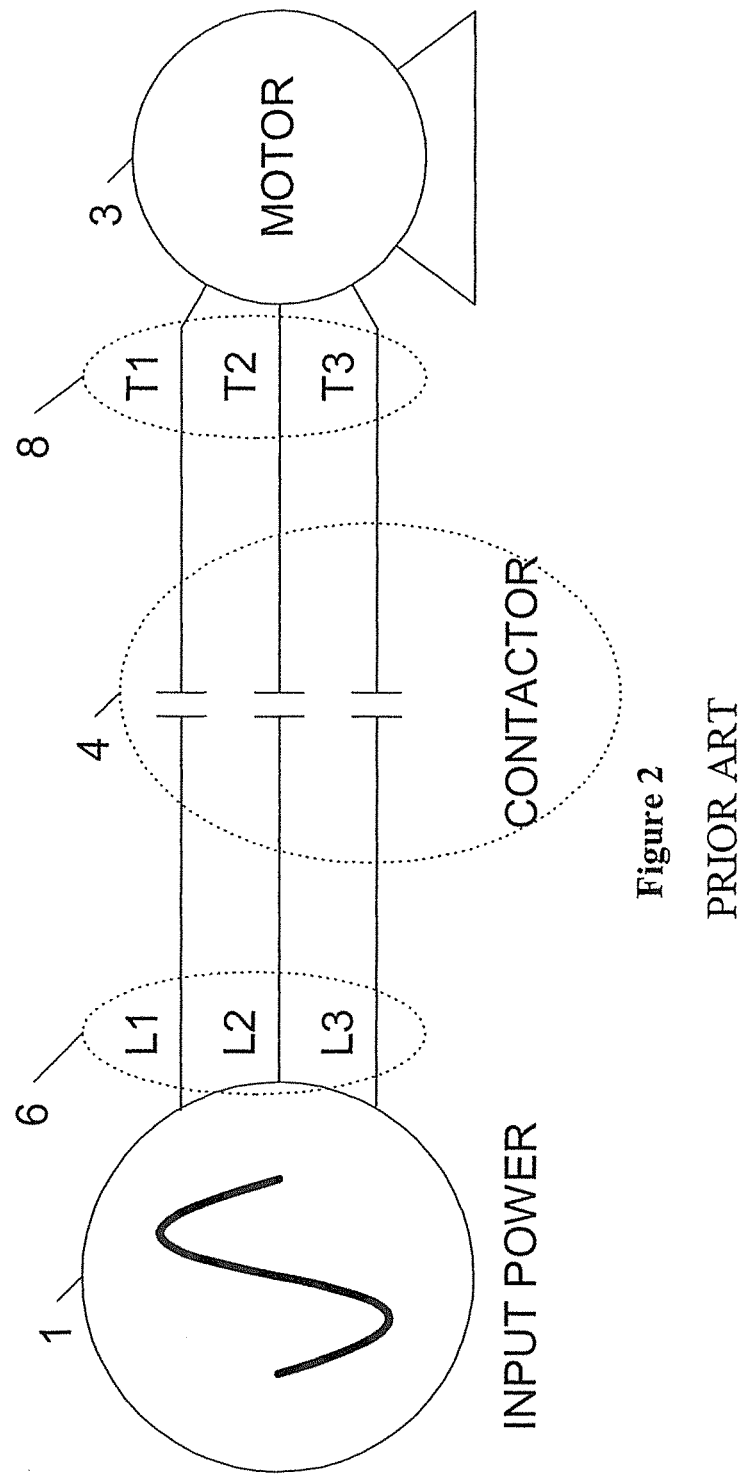
FIG. 2 is a block diagram showing how a motor is powered directly across the line.

Referring to FIG. 2, the motor 3 is shown in an across-the-line configuration. In this configuration, the AC source 1, as described above, develops three-phase power on feeder conductors labeled L1, L2, and L3. The AC source 1 is grounded. The L1, L2, and L3 conductors are connected to the contactor 4. The other side of the contactor 4 contacts are connected to conductors T1, T2, and T3 and further connected to the motor 3. To run the motor 3, the contactor 4 is commanded to close and thus supply the input power 1 to the motor 3.

Figure 3:
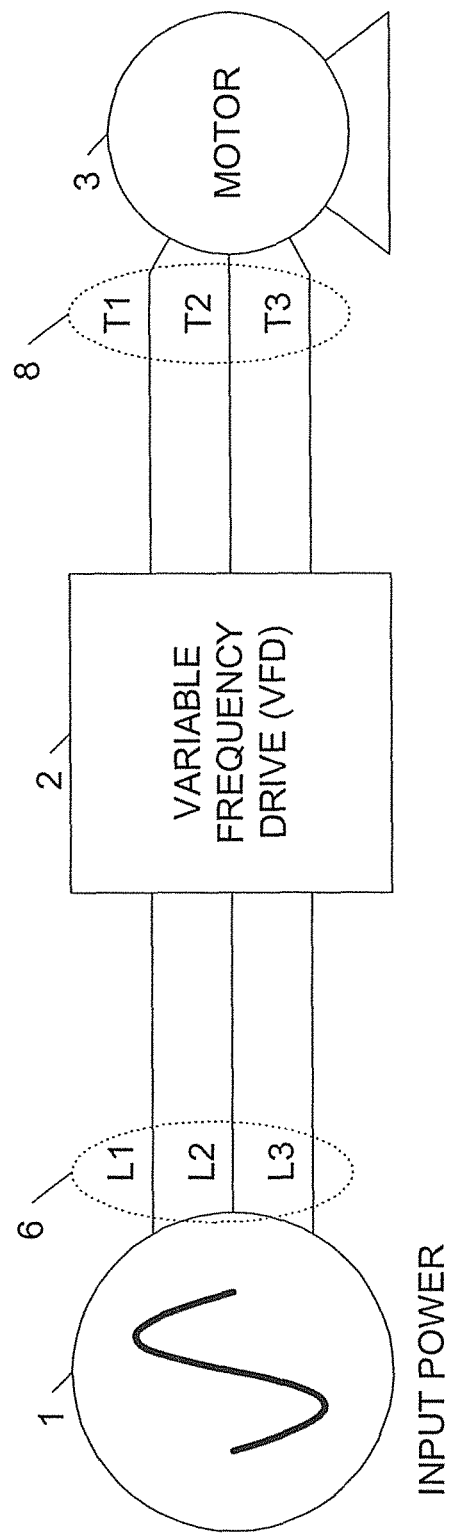
FIG. 3 is a block diagram showing how a motor is powered by a VFD.

Referring to FIG. 3, the motor 3 is shown in a drive configuration. In this configuration, the AC source 1, as described above, develops three-phase power on the feeder conductors 6 labeled L1, L2, and L3. The AC source 1 is grounded. The L1, L2, and L3 conductors are connected to the variable frequency drive (VFD) 2. The output terminals of the VFD 2 are connected to conductors T1, T2, and T3 and further connected to the motor 3. To run the motor 3, the VFD 2 is commanded to run in a conventional manner.

Figure 4:
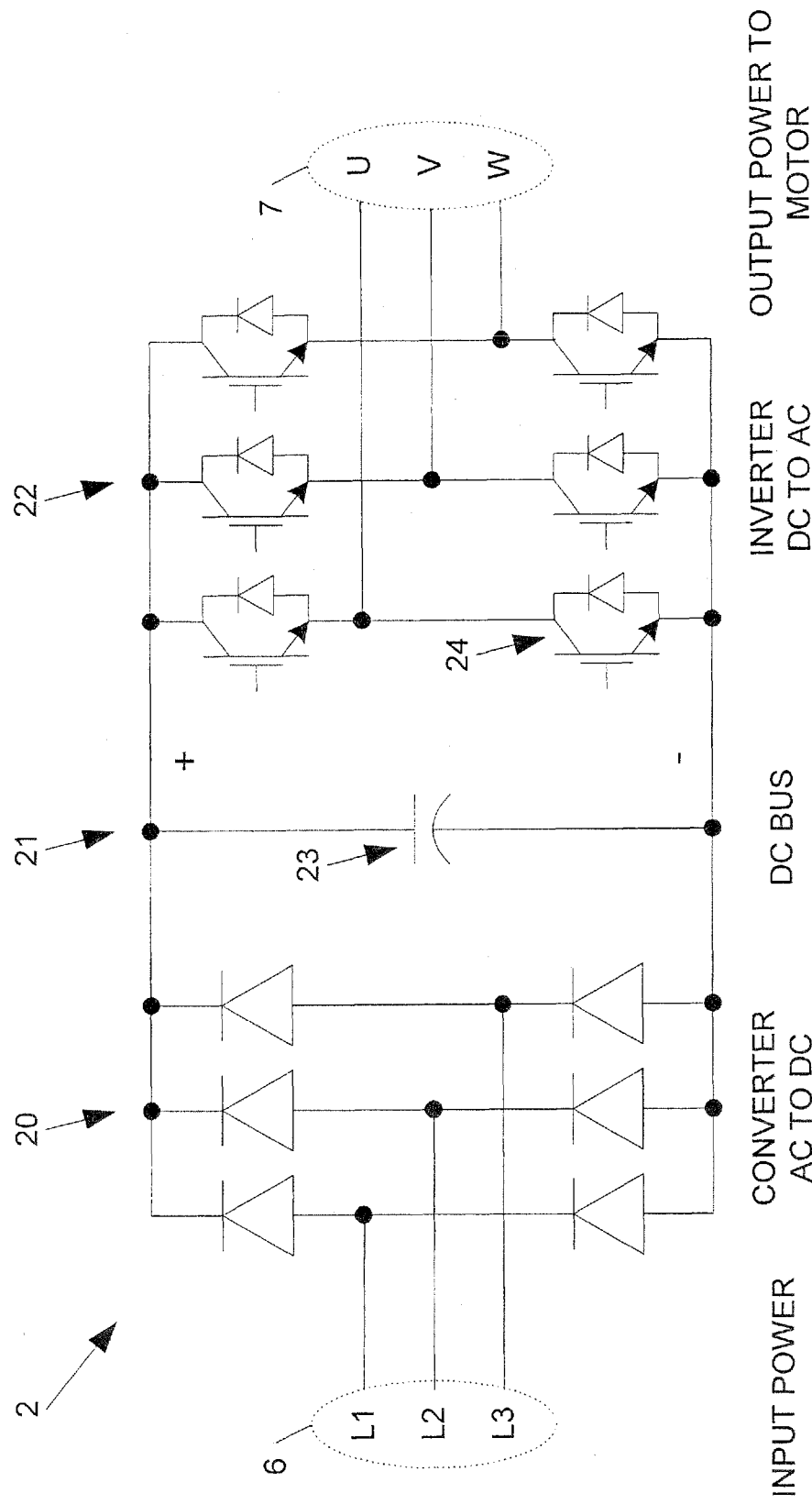
FIG. 4 is a generalized schematic of a VFD.

Referring to FIG. 4, a schematic diagram illustrates a typical circuit implementation for the VFD 2. The VFD 2 includes an AC/DC converter 20 connected by a DC bus 21 to a DC/AC inverter 22. Particularly, according to the illustrated embodiment of the invention, the AC/DC converter 20 comprises a full wave bridge rectifier circuit of conventional construction which is operable to convert three-phase AC power to DC power. The DC bus 21 includes a conventional filter 23. The DC bus 21 has rails labeled "+" and "−". The DC/AC inverter 22 comprises an inverter section. Particularly, the inverter section comprises a pulse width modulation (PWM) inverter, using insulated gate bipolar transistors (IGBTs) 24. The six (6) IGBTs 24 are connected in a three-phase bridge configuration to the DC bus 21 to develop power at the output terminals 7 labeled U, V, and W. The IGBTs 24 are pulse width modulated by signals on lines from a VFD control, which may be the same control 18 as that which implements the invention, using a conventional control scheme. Particularly, the PWM inverter 22 is controlled to create a sinusoidal effect for the induction motor 3. The pulse frequency used is fixed. The pulse width is varied to vary the sinusoidal frequency. The basic PWM control scheme may take any known form and does not itself comprise the invention.

Figure 5:
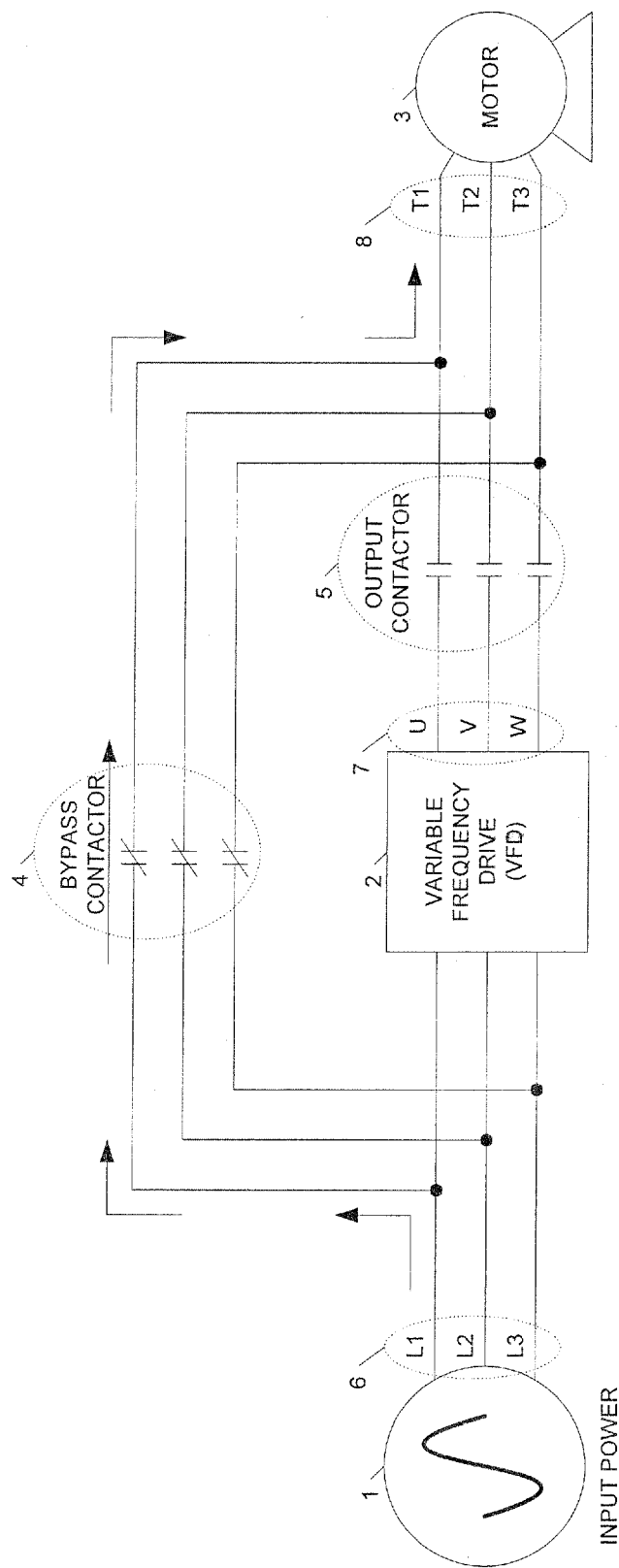
FIG. 5 shows the bypass configuration when the motor is running from the bypass contactor.

Referring to FIG. 5, the VFD bypass system consisting of a VFD in bypass configuration is again illustrated as in FIG. 1, without the control 18, but this time showing the system in the bypass mode. In bypass mode, the output contactor 5 is commanded to open and the bypass contactor 4 is commanded to close by the control 18. Power is then transferred from the input power source 1 through the conductors L1, L2, and L3, through the bypass contactor 4, through the conductors T1, T2, and T3, and to the three-phase-motor 3. The flow of this power is indicated by the arrows. This bypass mode is similar to the motor in an across-the-line configuration as shown in FIG. 2. To run the motor 3, the control 18 commands the bypass contactor 4 to close and thus supply the input power 1 to the three-phase-motor 3.

In accordance with the invention, the bypass mode can be used to provide a redundant operation mode in the event of a VFD failure, as is known, and/or can be used to implement an energy savings function as described herein.

Figure 6:
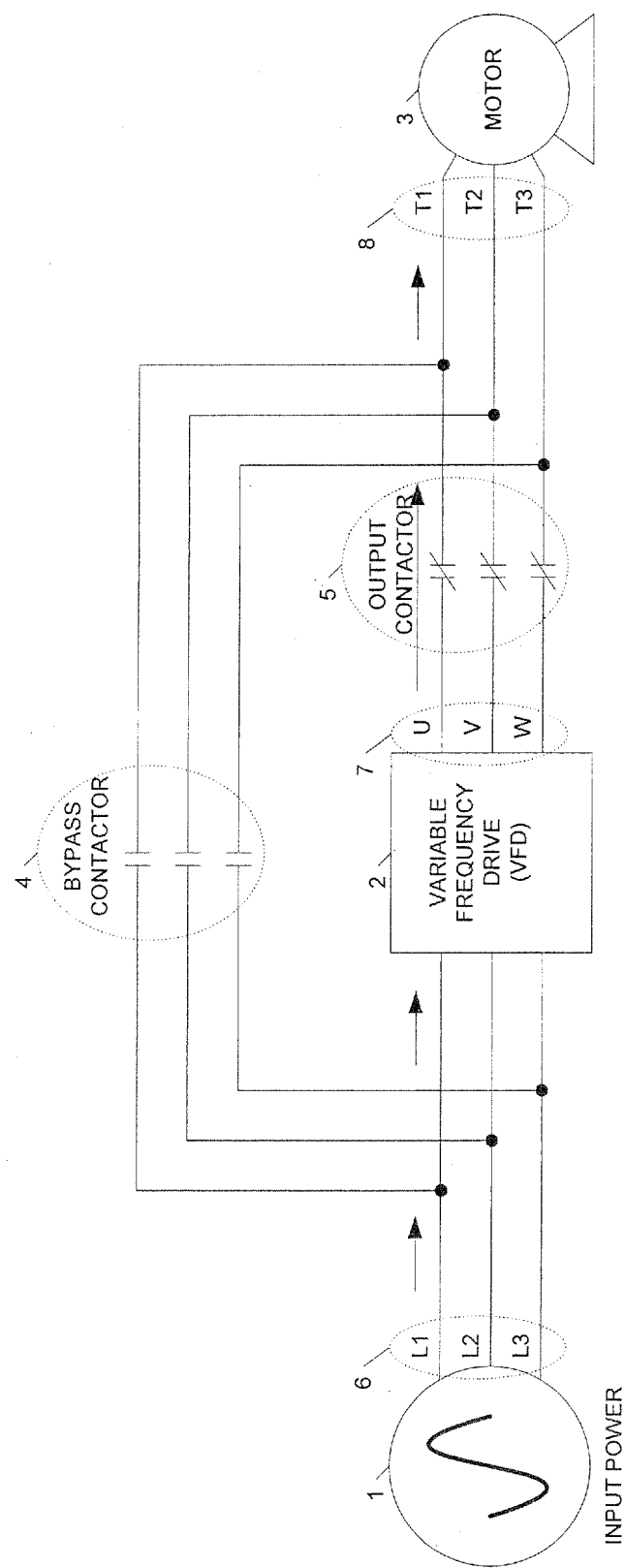
FIG. 6 shows the bypass configuration when the motor is running from the VFD.

Referring to FIG. 6, the VFD bypass system consisting of a VFD in bypass configuration is again illustrated as in FIG. 1, without the control 18, but this time showing the system in the drive mode. In the drive mode, the bypass contactor 4 is commanded to open and the output contactor 5 is commanded to close by the control 18. Power is then transferred from the input power source 1 through the conductors L1, L2, and L3, through the VFD 2, through the conductors U, V, and W, through the output contactor 5, through the conductors T1, T2, and T3, and to the three-phase-motor 3. The flow of this power is indicated by the arrows. This drive mode is similar to the motor being powered by a VFD as shown in FIG. 3. To run the motor 3, the control 18 commands the output contactor 5 to close and the VFD 2 to run, as described below.

Referring to the Table below, parameters used to implement the bypass energy savings are listed. These parameters are used in the control 18 to determine when to enter and exit the energy savings mode, and how to transition from the drive mode to the energy savings mode and back. As is apparent, different range and default values could be used.

| Parameter # | Name | Description | Range | Default |
| --- | --- | --- | --- | --- |
| 101 | Energy Saving En | Energy Savings Mode Enable. 0: Disable 1: Enable (Freq) 2: Enable (Freq + Output Current) | 0~2 | 0 Disable |
| 102 | Energy Freq | Energy Savings Mode Frequency. Sets the value of the VFD frequency reference for use in comparison to enter or exit Energy Savings mode. | 0.0~120.0 Hz | 60.0 |
| 103 | Energy Iout Lvl | Energy Savings Mode Output Current Level Allows system to switch when the output current rises above this level of motor rated current for time specified in Energy Time. | 0.0~100.0% | 0.0% Disabled |
| 104 | Energy Fref Dbnd | Energy Savings Mode Frequency Reference Deadband. Sets the tolerance around the VFD frequency reference value during comparisons to enter or exit Energy Savings mode. | 0.0~5.0 Hz | 0.5 |
| 105 | Energy Freq Dbnd | Energy Savings Mode Output Frequency Deadband. Sets the tolerance around the VFD output frequency value during comparisons to enter Energy Savings mode. | 0.0~5.0 Hz | 0.5 |
| 106 | Energy Iout Dbnd | Energy Savings Mode Output Current Deadband. Sets the tolerance around the VFD output current value during comparisons to enter or exit Energy Savings mode, in percent of motor rated current. | 0.0~30.0% | 15.0% |
| 107 | Energy Time | Energy Savings Mode Time. Sets the time that the VFD frequency reference and VFD output frequency must be within the set limits before transferring to Energy Savings mode. | 10~3600 sec | 30 |
| 108 | Energy Fref Increase | Energy Savings Mode Frequency Reference Increase Sets the value to add to the VFD | 0.0~10.0 Hz | 6.0 |

| Parameter # | Name | Description | Range | Default |
|---|---|---|---|---|
| | | frequency reference prior to starting the transfer to bypass for Energy Savings Mode. | | |
| 109 | Energy Delay Open | Energy Savings Mode Contactor Open Delay Time Sets the time delay after commanding the VFD output contactor or bypass contactor to open to ensure the contacts are actually open. | 0.0~5.0 s | 0.2 |
| 110 | Energy Delay Close | Energy Savings Mode Contactor Close Delay Time Sets the time delay after commanding the VFD output contactor or bypass contactor to close to ensure the contacts are actually closed. | 0.0~5.0 s | 0.2 |
| 111 | Min Baseblock Time | Minimum Baseblock Time Sets the minimum wait time for residual motor voltage decay after power is removed from a running motor. This will occur when the VFD enters baseblock mode or after the bypass contactor is opened. | 0.1~5.0 s | 0.2 |

In accordance with the invention, the VFD bypass system achieves energy efficiency and harmonic reduction by automatically switching to the bypass/energy savings mode when the motor speed as powered by the variable frequency drive closely matches the motor speed that would be achieved by connecting the motor directly to the incoming power. The VFD bypass system is configured to use one of two different energy savings modes. The first energy savings mode is a frequency mode, referred to in the Table as Freq. In the frequency mode the automatic switching occurs based on the VFD controlling the motor at the input line frequency. The second energy savings mode is a frequency and output current mode. In the frequency and output current mode the VFD bypass system will not switch to energy savings mode unless the switchover will achieve a preselect energy savings. This decision will be based on both frequency and load current, which is application dependent. For both modes, the switchover will not occur until the frequency or the frequency and output current are within a deadband amount for a user selectable period of time. These parameters are defined in the Table above.

Figure 10:
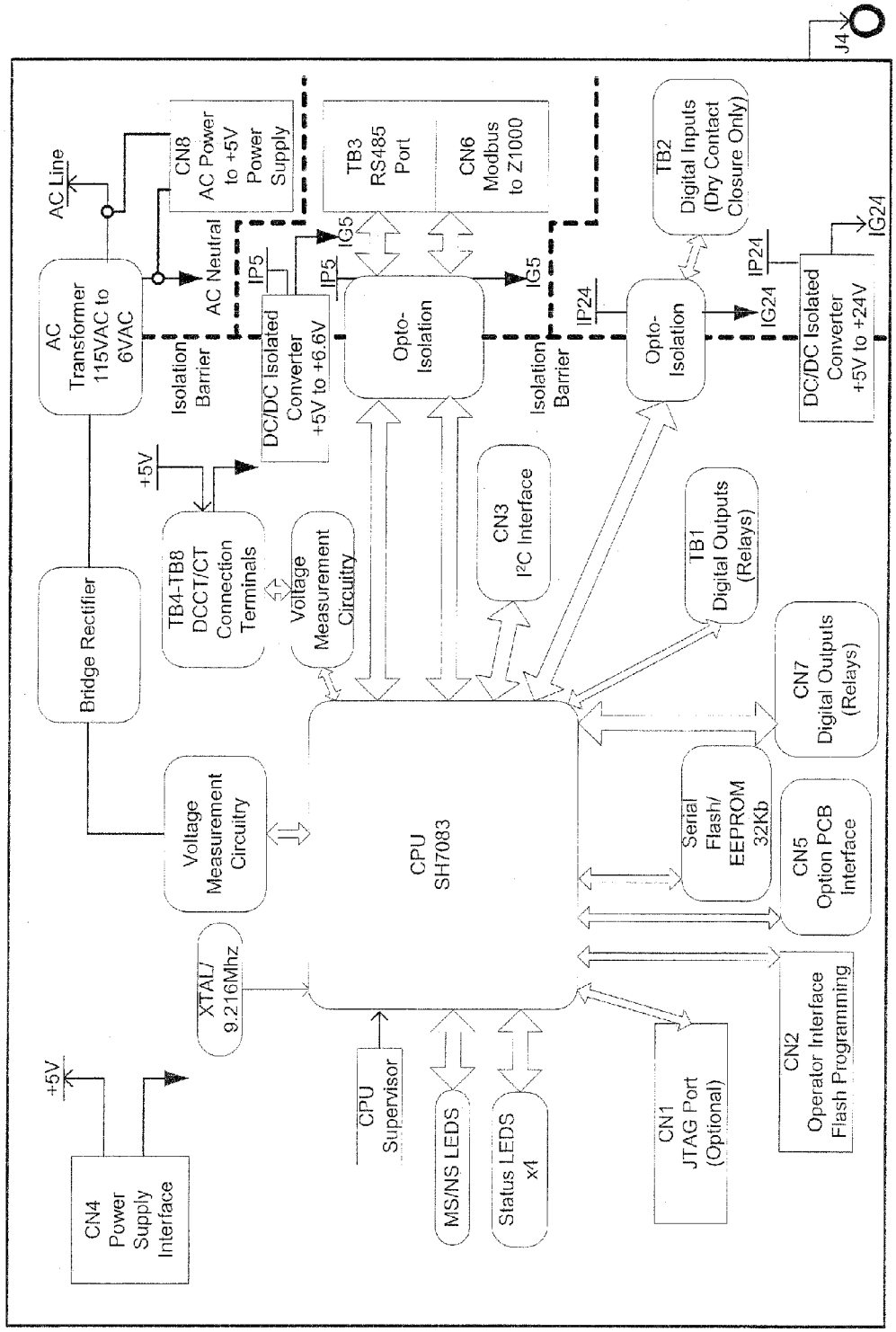
FIG. 10 is a hardware block diagram for a control board implementing functionality of the control of FIG. 1.

A hardware block diagram for a control board for the bypass control 18 is shown in FIG. 10. The bypass control comprises a conventional microprocessor based control including a CPU and associated memory. The associated memory stores software for implementing functionality of the energy savings features described herein. The software is described below relative to the flow diagrams of FIGS. 7A-D. The control board may be mounted in a bypass enclosure along with the VFD 2 and other necessary hardware and will be used to control the bypass functions of the VFD bypass system including motor run and stop and energy savings functions. The control board will interface with a remote operator panel, not shown. This control board will also accept network communications via on-board Modbus protocol and also via standard communication cards.

Referring back to FIG. 1, the control 18 may be implemented using a separate control board, such as shown in FIG. 10. If the control 18 is a separate control board, then the method used to communicate with the VFD 2 is typically serial, however other forms of communication may be used. Alternatively, the functionality of the control 18 can be logic contained within the VFD 2 itself. The present application describes the former embodiment, in which signals are transferred between the control 18 and the VFD 2, it being understood that the features of the invention could also be implemented using the latter embodiment in which signals may be in the form of software data transferred within the VFD itself. As such, regardless of how the overall system is configured, the control 18 is operatively associated with the VFD 2 to achieve the energy savings functionality described herein.

The control 18 receives various input signals and develops output commands for implementing energy savings. The control 18 develops a command via a signal on a line 10 to the bypass contactor 4 to open or close. The control 18 develops a command via a signal on a line 15 to the output contactor 5 to open or close. These two signals place the VFD bypass system into either the bypass mode as shown in FIG. 5 or into the drive mode as shown in FIG. 6. The techniques used by the control 18 to command the bypass contactor 4 and the output contactor 5 are well known and thus will not be discussed herein. Current sensors of conventional design sense line current on each of the U, V, and W conductors and are likewise connected to the control 18 with signal lines 14. This current sensing is already performed by the VFD 2 with well known methods and will not be discussed herein. The VFD 2 supplies the control 18 with inputs on a line 11 for VFD Frequency Reference, VFD Output Current, VFD Output Frequency, and VFD Acceleration Time. The control 18 supplies the VFD 2 with output signals for a Baseblock Command on a line 12 and VFD Frequency Reference Command Override on a line 13. The control 18 also outputs an Energy Savings Indicator command on a line 17 to turn on or off an Energy Savings Indicator 16.

Referring to FIGS. 7A, 7B, 7C and 7D, a flow diagram illustrates a program implemented in the control 18 of FIG. 1, and shown in detail in FIG. 10. The program begins at a startup node 200. Various setup parameters are initialized in a block 201. These parameters are shown in the above Table and are user selectable. Each parameter is identified with a parameter # in the Table. These parameters include the conditions to start energy savings. The conditions are defined in an Energy Savings Mode Enable parameter 101. If the parameter 101 is set for disable, then the conditions to enter energy savings mode will never be met. If the parameter 101 is set to Enable (Freq), then the conditions to enter energy savings mode is when both the VFD Frequency Reference and the VFD Output Frequency received from the VFD 2 on the lines 11 are equal to the value set in the Energy Frequency parameter 102, and are within the bounds of the Energy Frequency Reference Deadband parameter 104 and the Energy Output Frequency Deadband parameter 105. If the parameter 101 is set to Enable (Freq+Output Current), then the conditions to enter energy savings mode are when the conditions of Enable (Freq) as just explained are met and when the VFD Output Current on the line 14 is equal to the value entered in the Energy Output Current Level parameter 103, and is within the bounds of the Energy Output Current Deadband parameter 106.

A decision block 202 checks to see if the conditions to start the energy savings mode, as determined by Energy Savings Mode Enable parameter 101, are true. If the conditions are true, then a timer is started at a block 203. If the conditions are not true, then the program loops back around the decision block 202 and continues to wait for the conditions to be true. While timing from the block 203, a decision block 204 continues to monitor the conditions to start the energy savings mode. If the conditions are no longer true, then the program exits back to the decision block 202 and waits for the conditions to be true again. If the conditions remain true at the decision block 204, then a decision block 205 determines if the timer has exceeded the energy time of the parameter 107. If not, then the program loops back to decision block 204 and continues to monitor the conditions to start the energy savings mode. If the conditions remain true for the time of the parameter 107, then the program moves to an enter energy savings routine at a node 206.

Figure 7A:
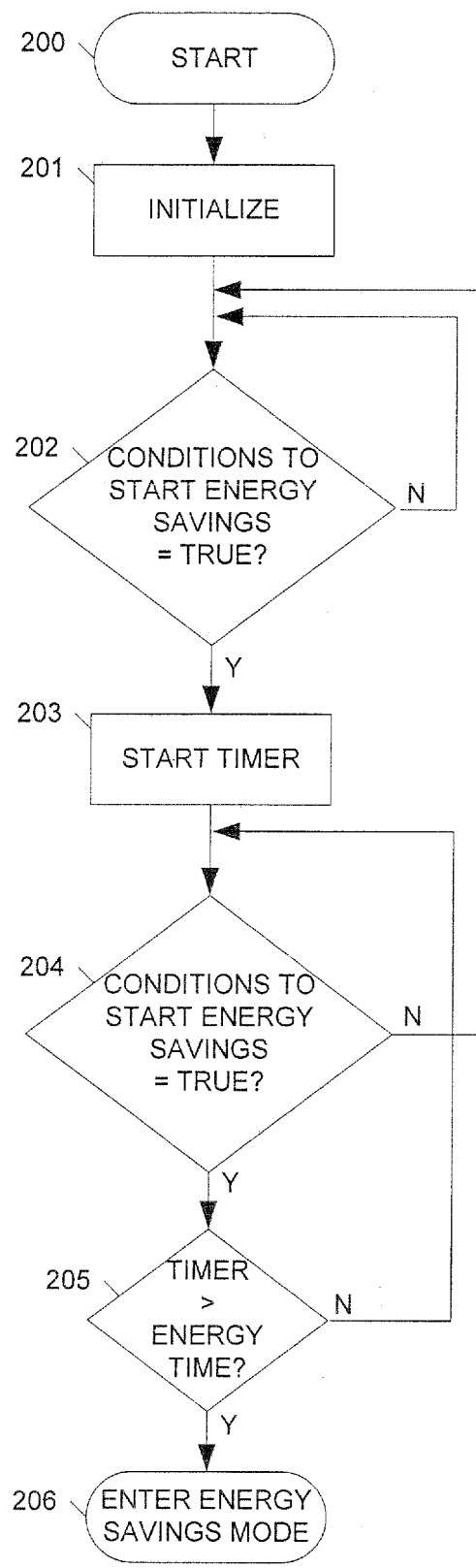
FIGS. 7A-D comprise a flowchart diagram of the energy savings method implemented in the control of FIG. 1.
Figure 7B:
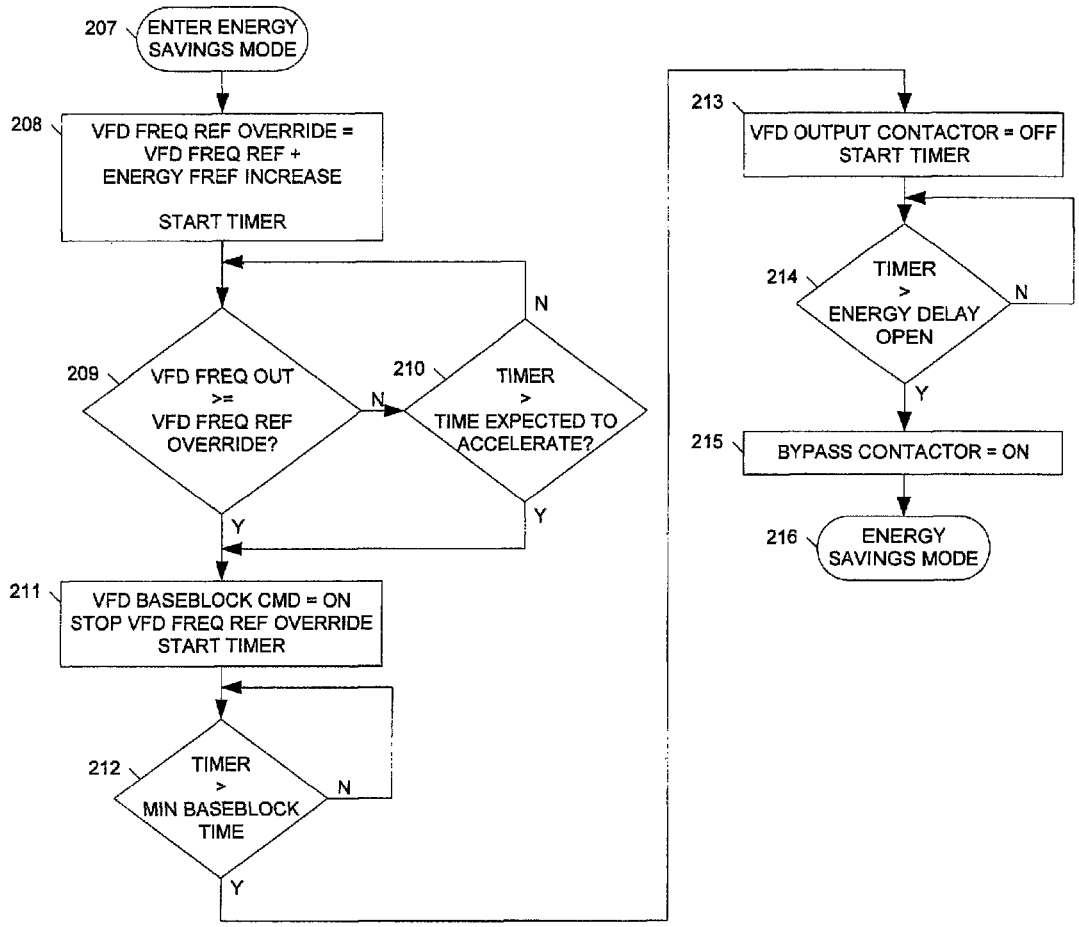

The enter energy savings routine begins at a node 207 of FIG. 7B. This routine transitions the VFD bypass system from the drive mode to the bypass mode. There will be a brief period of time, on the order of ½ second, where no power will be supplied to the motor 3. This routine allows the user to temporarily increase frequency so that when power to the motor 3 is removed the frequency will not drop to an undesirable level.

The energy savings mode starts at a block 208 which sets the VFD Frequency Reference Override on the line 13 to the VFD 2 to be equal to the sum of the active VFD Frequency Reference from the VFD 2 on the line 11 and the Energy Frequency Reference Increase parameter 108. The program also starts a timer. In a decision block 209, the program determines if the VFD Output Frequency from the VFD 2 on the line 11 is greater than or equal to the just calculated VFD Frequency Reference Override on the line 13. If so, then the program continues the sequence to enter the energy savings mode. If the VFD Output Frequency on the line 11 has not yet reached the calculated VFD Frequency Reference Override on the line 13, then a decision block 210 checks to see if the timer has exceeded the time expected for the VFD Output Frequency on the line 11 to reach the value in VFD Frequency Reference Override on the line 13. If the timer did not time out, then the program continues to loop back to the start of decision block 209. If the timer does time out, then it may be that the VFD cannot achieve the VFD Frequency Reference Override on the line 13, so the program continues the sequence to enter energy savings mode. At a block 211 the VFD 2 is given a Baseblock Command on the line 12, the override of the VFD Frequency Reference ceases, and a Timer is started. The baseblock command sets the VFD 2 to a baseblock mode which shuts off the drive and stops firing the IGBTs 24. The timer is used because the drive output shutoff will have a decay time. A decision block 212 continues to wait until the timer exceeds the value set in the minimum baseblock time parameter 111. This provides a minimum time before restart to avoid residual motor feedback. When this minimum baseblock time is met, then at a block 213 the command on the line 15 to the VFD Output Contactor 5 is set to off and a timer starts. In a decision block 214, the timer is continually monitored until it exceeds the value in the Energy Delay Open parameter 109. This allows the contacts sufficient time to open. When the timer value is met, then at a block 215 the Bypass Contactor 4 is commanded by a signal on the line 10 to turn on. At this point the program moves to an energy savings routine at a node 216.

Figure 7C:
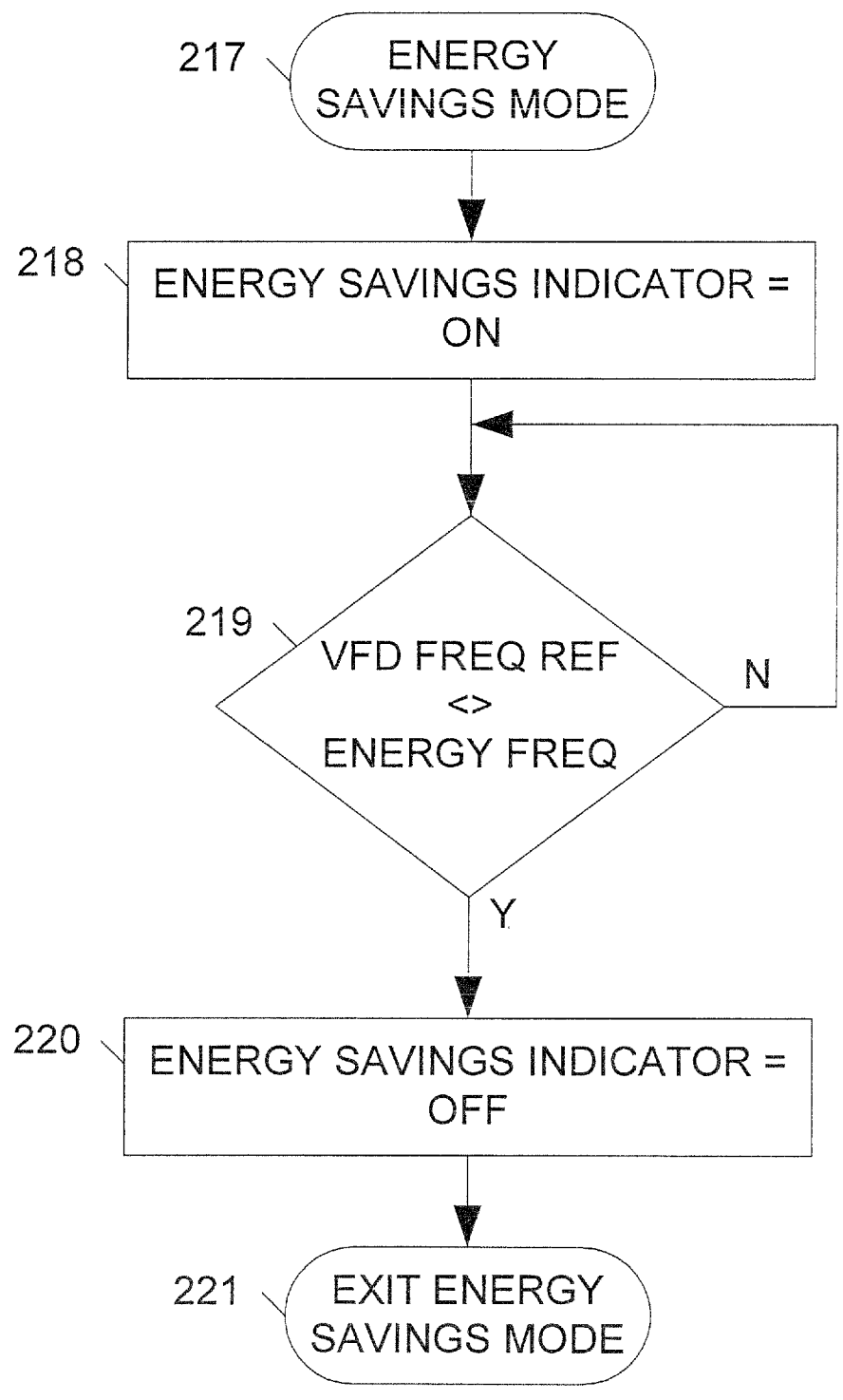

The energy savings routine begins at a node 217 on FIG. 7C. In the energy savings routine, the Energy Savings Indicator 16 is turned on via the signal on the line 17 at a block 218. The energy savings routine thereafter monitors the conditions necessary to stay in or exit from the energy savings mode. A decision block 219 monitors the VFD Frequency Reference on the line 11 from the VFD 2. When the Frequency Reference is no longer equal to the value in the Energy Frequency parameter 102, within the bounds of the Energy Frequency Reference Deadband parameter 104, then the Energy Savings Indicator 16 is turned off at a block 220 and the program moves to an exit energy savings mode routine at a node 211.

Figure 7D:
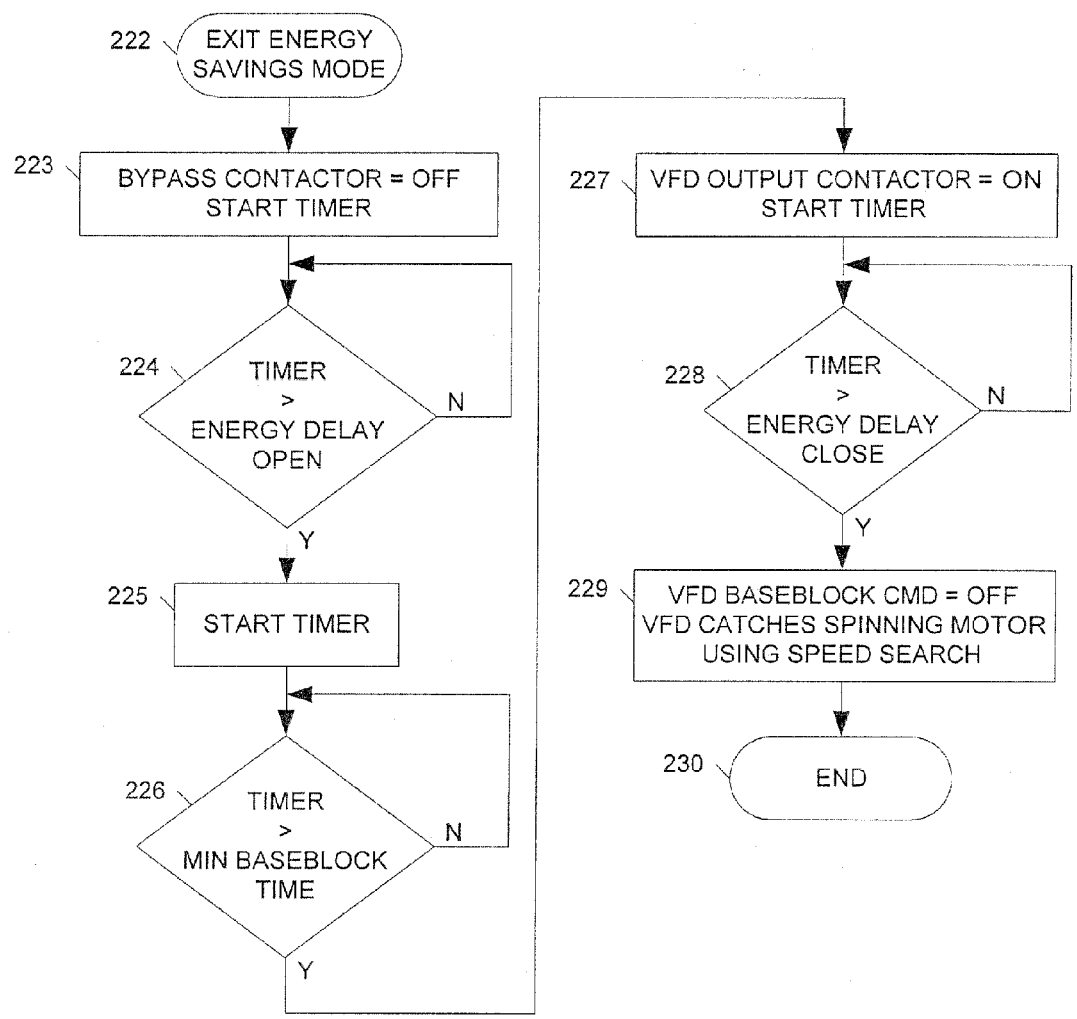

The exit energy savings mode routine begins at a node 222 on FIG. 7D. The command on the line 10 to the bypass contactor 4 is set to off at a block 223 and a timer is started. This timer allows the bypass contactor sufficient time to open. This deenergizes the motor 3. At a decision block 224, the timer is continually monitored until it exceeds the value in the energy delay open parameter 109. At a block 225, the timer is started again. This timer is used to allow the motor field to collapse. In a decision block 226, the timer is continually monitored until it exceeds the value in the minimum baseblock time parameter 111. When the timer exceeds this value, then at a block 227 a command on the line 15 to the VFD Output Contactor 5 is set to on and a timer is started to allow the contacts to close. A decision block 228 continually monitors the timer until it exceeds the value in energy delay close parameter 110. When the timer exceeds this value, then at a block 229 the VFD Baseblock Command on the line 12 is set to off to return control to the VFD 2. The VFD 2 starts firing the IGBTs 24 based on the VFD Frequency reference. The VFD 2 is otherwise operated to "catch" a spinning motor using its speed search function, which is a function already present in the VFD 2 and will not be discussed here. At this point the energy savings mode has ended at a node 230 and can then start again.

Figure 8:
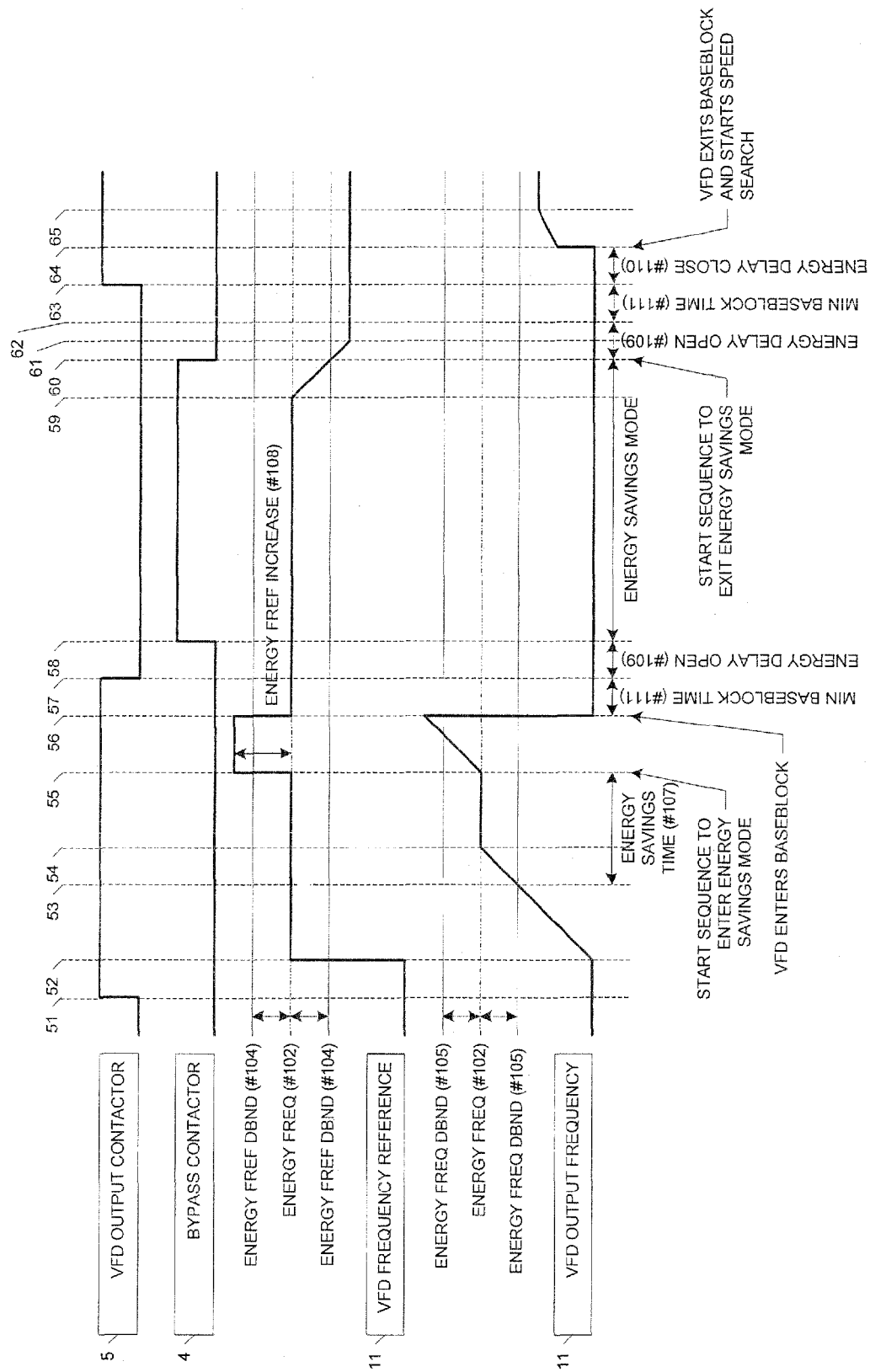
FIG. 8 is a diagram showing the sequence of events leading to the energy savings mode when only the VFD frequency reference and VFD output frequency are considered.

Referring to FIG. 8, the normal sequence of events is shown when the Energy Savings Enable parameter 101 is set to Enable (Freq). At a time 51, the control 18 places the system into Drive Mode by turning on the VFD Output Contactor 5 while maintaining the Bypass Contactor 4 off. At a time 52 the VFD 2 had been given a run command and a VFD Frequency Reference that the control 18 monitors. In this sequence diagram, the VFD Frequency Reference is shown to be equal to the Energy Frequency parameter 102 within the bounds of the Energy Frequency Reference Deadband parameter 105. It can also be seen that the VFD Output Frequency starts to accelerate, which is also monitored by the control 18. At a time 53 the VFD Output Frequency has reached the lower bounds, defined by the parameter 105, of the targeted Energy Frequency parameter 105. At this point the conditions to start energy savings mode are true, so a timer is started. At a time 54, the VFD Output Frequency has reached its targeted frequency, which happens to be equal to the Energy Frequency parameter 102, and has stopped accelerating.

At a time 55, the conditions to start energy savings mode have remained true since starting the timer at time 53, and now the timer is equal to the value in Energy Savings Time parameter 107, so it is time to transition into the energy savings mode. The control 18 calculates a temporary frequency reference by summing the existing VFD Frequency Reference with the value in Energy Frequency Reference Increase parameter 108, then it commands the VFD 2 to use this value as its new frequency reference as can be seen in the step rise of the VFD Frequency Reference. The VFD 2 begins to accelerate to this new frequency reference value as shown by the VFD Output Frequency beginning to rise. At a time 56 the VFD Output Frequency has achieved the targeted VFD Frequency Reference, so the control 18 commands the VFD 2 to enter the baseblock mode, the override of the VFD Frequency Reference is terminated, and a timer is started. At a time 57, the timer has achieved the value in the Minimum Baseblock Time parameter 111 so the VFD Output Contactor 5 is commanded off and a timer starts. At a time 58, the timer has achieved the value in the Energy Delay Open parameter 109, so the Bypass Contactor 4 is commanded on, placing the system in bypass mode and thus is now in energy savings mode.

At a time 59, the control observes the VFD Frequency Reference starting to decrease, but still within the bounds of the Energy Frequency parameter 102. At a time 60 the VFD Frequency Reference has decreased to a point outside the bounds of the Energy Frequency parameter 102, so it is time to exit energy savings mode. The Bypass Contactor 4 is commanded off and a timer is started. At a time 61 the VFD Frequency Reference has stopped decreasing, but it is still out of the bounds of Energy Frequency parameter 102. At a time 62, the timer has exceeded the Energy Delay Open parameter 109 and the timer starts again. At a time 63, the timer has exceeded the Minimum Baseblock Time parameter 111, so the control 18 turns on the VFD Output Contactor 5 placing the system back to drive mode and starts a timer. At a time 64 the timer has reached the value in Energy Delay Close parameter 110 and thus the control 18 commands the VFD to leave the baseblock mode. The VFD 2 then begins its speed search mode to start controlling an already spinning motor. At a time 65 the VFD has completed its speed search mode and the VFD Output Frequency 11 is equal to the VFD Frequency Reference.

Figure 9:
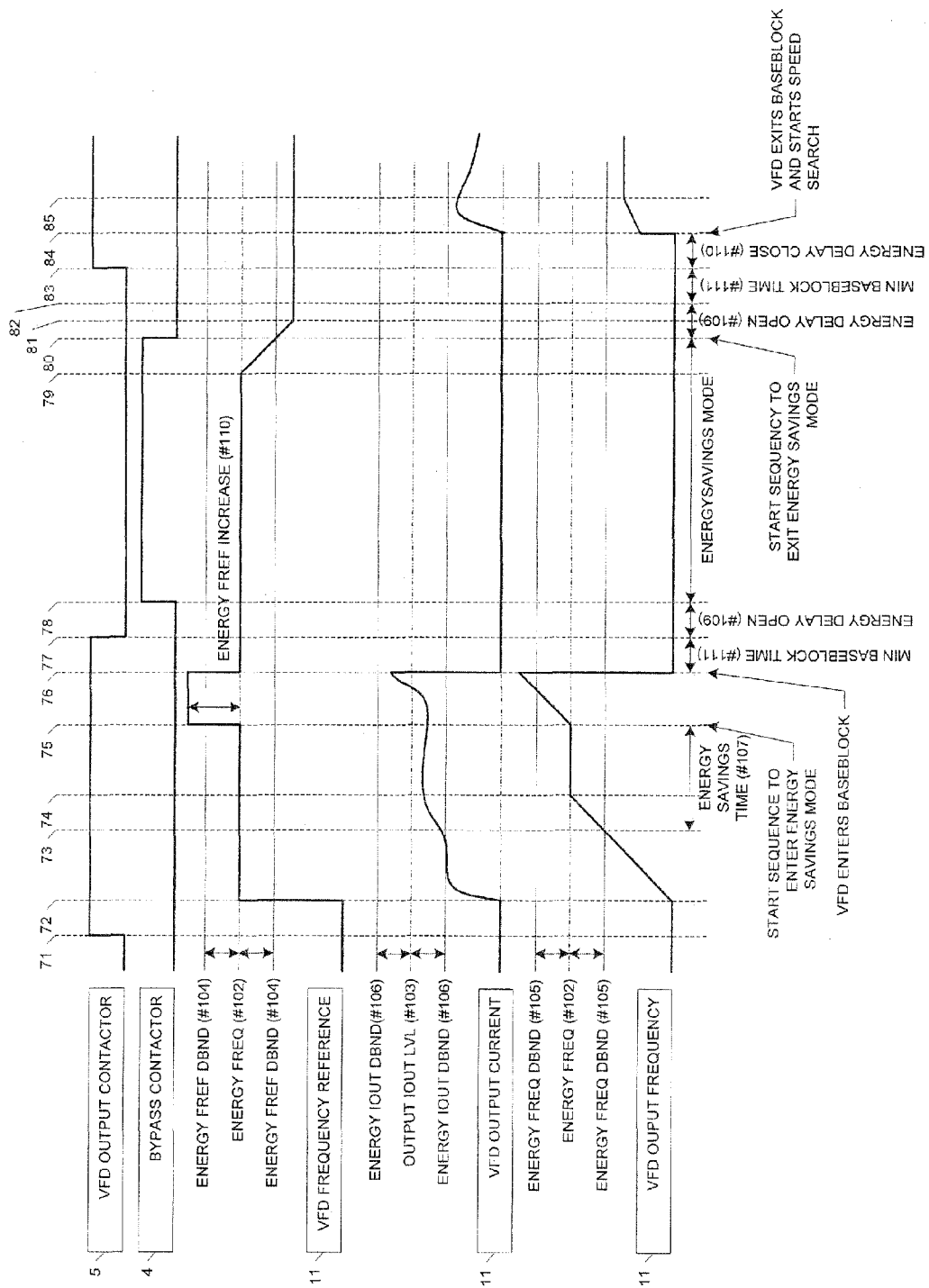
FIG. 9 is a diagram showing the sequence of events leading to the energy savings mode when the VFD frequency reference, VFD output frequency, and VFD output current are considered.

Referring to FIG. 9, the normal sequence of events is shown when the Energy Savings Enable parameter 101 is set to Enable (Freq+Output Current). At a time 71, the control 18 places the system into Drive Mode by turning on the VFD Output Contactor 5 while keeping off the Bypass Contactor 4. At a time 72 the VFD 2 had been given a run command and a VFD Frequency Reference that the control 18 monitors. In this sequence diagram, the VFD Frequency Reference is shown to be equal to the Energy Frequency parameter 102 within the bounds of the Energy Frequency Reference Deadband parameter 105. It can also be seen that the VFD Output Frequency starts to accelerate and the VFD Output Current starts to increase, both of which are monitored by the control 18. At a time 73 the VFD Output Frequency has reached the lower bounds, defined by the parameter 105, of the targeted Energy Frequency parameter 105. The VFD Output Current is also within the bounds of the Output Current Level parameter 103. At this point the conditions to start energy savings mode are true, so a timer is started. At a time 74, the VFD Output Frequency has reached its targeted frequency, which happens to be equal to the Energy Frequency parameter 102, and has stopped accelerating.

At a time 75, the conditions to start energy savings mode have remained true since starting the timer at the time 73, and now the timer is equal to the value in Energy Savings Time parameter 107. It is time to transition into the energy savings mode. The control 18 calculates a temporary frequency reference by summing the existing VFD Frequency Reference with the value in Energy Frequency Reference Increase parameter 108, then it commands the VFD 2 to use this value as its new frequency reference as can be seen in the step rise of the VFD Frequency Reference. The VFD begins to accelerate to this new frequency reference value as shown by the VFD Output Frequency beginning to rise. At a time 76 the VFD Output Frequency has achieved the targeted VFD Frequency Reference, so the control 18 commands the VFD 2 to enter the baseblock mode, the override of the VFD Frequency Reference is terminated, and a timer is started. At a time 77, the timer has achieved the value in the Minimum Baseblock Time parameter 111 so the VFD Output Contactor 5 is commanded off and a timer starts. At a time 78, the timer has achieved the value in the Energy Delay Open parameter 109, so the Bypass Contactor 4 is commanded on, placing the system in bypass mode and thus is now in energy savings mode.

At a time 79, the control observes the VFD Frequency Reference starting to decrease, but still within the bounds of Energy Frequency parameter 102. At a time 80 the VFD Frequency Reference has decreased to the point outside the bounds of Energy Frequency parameter 102, so it is time to exit energy savings mode. The Bypass Contactor 4 is commanded off and a timer is started. At a time 81 the VFD Frequency Reference has stopped decreasing, but it is still out of the bounds of Energy Frequency parameter 102. At a time 82, the timer has exceeded the longer of either the Energy Delay Open parameter 109 or the Minimum Baseblock Time parameter 111, so the control 18 turns on the VFD Output Contactor 5 placing the system back to drive mode and starts a timer. At a time 83 the timer has reached the value in the Energy Delay Close parameter 110 and thus the control 18 commands the VFD 2 to leave the baseblock mode. The VFD 2 then begins its speed search mode to start controlling an already spinning motor. At a time 84 the VFD 2 has completed its speed search mode and the VFD Output Frequency is equal to the VFD Frequency Reference.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

Thus in accordance with the invention a variable frequency drive includes a bypass configuration. Energy efficiency and harmonic reduction are achieved by automatically switching to bypass mode when the motor speed as powered by the variable frequency drive closely matches the motor speed that would be achieved by connecting the motor directly to the incoming power.

The invention claimed is:

1. An AC motor drive system comprising:
a variable frequency drive (VFD) for receiving AC power from a power source and developing variable frequency power at output terminals;
a bypass contactor operatively connected between the power source and an AC motor;
an output contactor operatively connected between the VFD output terminals and the AC motor; and
a bypass control operatively associated with the VFD, the bypass contactor and the output contactor, the bypass control including a drive mode in which the output contactor is controlled to connect the VFD to the motor and a bypass mode in which the bypass contactor is controlled to connect the power source to the motor, the bypass control monitoring operation of the VFD to automatically switch to the bypass mode when motor speed as powered by the VFD approximates the motor speed that would be achieved by connecting the motor directly to the power source, wherein the bypass control develops a command to the VFD to increase a frequency reference prior to switching from the drive mode to the bypass mode.

2. The AC motor drive system of claim 1 wherein the bypass control operates in a frequency mode wherein the automatic switching occurs based on the VFD controlling the motor at the input line frequency.

3. The AC motor drive system of claim 1 wherein the bypass control operates in a frequency and output current mode wherein the automatic switching occurs when both frequency and load current are within a preselect range to achieve a preselect energy savings.

4. The AC motor drive system of claim 1 wherein the bypass control automatically switches to the bypass mode only after motor speed as powered by the VFD approximates the motor speed that would be achieved by connecting the motor directly to the power source for a preselect period of time.

5. The AC motor drive system of claim 1 wherein the bypass control develops a command to the VFD to stop developing output power in the bypass mode.

6. The AC motor drive system of claim 1 wherein the bypass control controls the output contactor to open a preselect time period after determining motor speed as powered by the VFD approximates the motor speed that would be achieved by connecting the motor directly to the power source, and controls the bypass contactor to close a preselect time period after commanding the output contactor to open.

7. The AC motor drive system of claim 1 wherein the bypass mode monitors operation of the VFD to automatically switch from the bypass mode to the drive mode when motor speed as commanded by the VFD differs from the motor speed achieved by connecting the motor directly to the power source by a preselect amount.

8. The AC motor drive system of claim 1 wherein the VFD is operatively connected to the bypass control with a serial communication link.

9. An AC motor drive system comprising:
a variable frequency drive (VFD) for receiving AC power from a power source and developing variable frequency power at output terminals;
a bypass contactor operatively connected between the power source and an AC motor;
an output contactor operatively connected between the VFD output terminals and the AC motor; and
a bypass control operatively associated with the VFD, the bypass contactor and the output contactor, the bypass control including a drive mode in which the output contactor is controlled to connect the VFD to the motor and a bypass mode in which the bypass contactor is controlled to connect the power source to the motor, the bypass control monitoring operation of the VFD to automatically switch to the bypass mode when motor speed as powered by the VFD approximates the motor speed that would be achieved by connecting the motor directly to the power source, wherein the bypass control is operatively associated with the VFD to monitor a frequency reference, output current and output frequency.

10. An AC motor drive system comprising:
a variable frequency drive (VFD) for receiving AC power from a power source and developing variable frequency power at output terminals;
a bypass contactor operatively connected between the power source and an AC motor;
an output contactor operatively connected between the VFD output terminals and the AC motor; and
a bypass control operatively associated with the VFD, the bypass contactor and the output contactor, the bypass control including a drive mode in which the output contactor is controlled to connect the VFD to the motor and an energy savings mode in which the bypass contactor is controlled to connect the power source to the motor, the bypass control monitoring operation of the VFD to determine if operating in the energy savings mode provides a preselect energy savings and if so then automatically switching to the energy savings mode, wherein the bypass control develops a command to the VFD to increase a frequency reference prior to switching from the drive mode to the energy savings mode.

11. The AC motor drive system of claim 10 wherein the bypass control operates in a frequency mode wherein the automatic switching occurs based on the VFD controlling the motor at the input line frequency.

12. The AC motor drive system of claim 10 wherein the bypass control operates in a frequency and output current mode wherein the automatic switching occurs when both frequency and load current are within a preselect range to achieve the preselect energy savings.

13. The AC motor drive system of claim 10 wherein the bypass control automatically switches to the energy savings mode only after motor speed as powered by the VFD approximates the motor speed that would be achieved by connecting the motor directly to the power source for a preselect period of time.

14. The AC motor drive system of claim 10 wherein the bypass control develops a command to the VFD to stop developing output power in the energy savings mode.

15. The AC motor drive system of claim 10 wherein the bypass control controls the output contactor to open a preselect time period after determining motor speed as powered by the VFD approximates the motor speed that would be achieved by connecting the motor directly to the power source, and controls the bypass contactor to close a preselect time period after commanding the output contactor to open.

16. The AC motor drive system of claim 10 wherein the bypass mode monitors operation of the VFD to automatically switch from the energy savings mode to the drive mode when motor speed as commanded by the VFD differs from the motor speed achieved by connecting the motor directly to the power source by a preselect amount.

17. The AC motor drive system of claim 10 wherein the VFD is operatively connected to the bypass control with a serial communication link.

18. An AC motor drive system comprising:
- a variable frequency drive (VFD) for receiving AC power from a power source and developing variable frequency power at output terminals;
- a bypass contactor operatively connected between the power source and an AC motor;
- an output contactor operatively connected between the VFD output terminals and the AC motor; and
- a bypass control operatively associated with the VFD, the bypass contactor and the output contactor, the bypass control including a drive mode in which the output contactor is controlled to connect the VFD to the motor and an energy savings mode in which the bypass contactor is controlled to connect the power source to the motor, the bypass control monitoring operation of the VFD to determine if operating in the energy savings mode provides a preselect energy savings and if so then automatically switching to the energy savings mode, wherein the bypass control is operatively associated with the VFD to monitor a frequency reference, output current and output frequency.

* * * * *